March 30, 1948.    P. K. CHATTERJEA    2,438,495
THERMISTOR CIRCUIT INTERRUPTER CONTROL SYSTEM
RESPONSIVE TO LOAD CIRCUIT CONDITIONS
Filed March 2, 1944
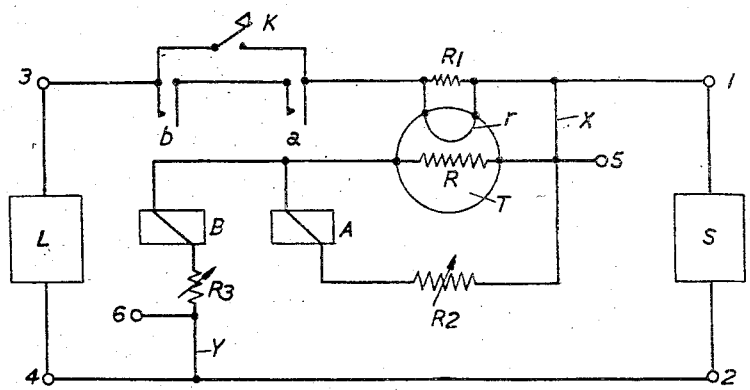
Inventor
Prafulla Kumar Chatterjea
By
Attorney Patented Mar. 30, 1948

2,438,495

UNITED STATES PATENT OFFICE 2,438,495

THERMISTOR CIRCUIT INTERRUPTER CONTROL SYSTEM RESPONSIVE TO LOAD CIRCUIT CONDITIONS

Prafulla Kumar Chatterjea, London, England, assignor, by mesne assignments, to International Standard Electric Corporation, New York, N. Y., a corporation of Delaware Application March 2, 1944, Serial No. 524,760
In Great Britain April 9, 1943

5 Claims. (Cl. 175—294)

The present invention relates to arrangements for supplying electric currents to a load, and particularly to means for disconnecting the load under specified or abnormal conditions.

It frequently happens that a load or other utilisation device has to be operated under some specified conditions of current or voltage, and in order to prevent damage to apparatus or failure of some process, or for some other reason, it is desirable to provide means for disconnecting the load from the source of current when the specified conditions cease to hold. For example, the current flowing in the load (or alternatively the voltage at its terminals) may be required to remain within a certain range defined by maximum and minimum limits, the load being cut off as soon as the specified range is departed from.

One or two examples will be given of cases where the invention may be advantageously applied.

(a) In the operation of series-wound motors, it may be dangerous for the load to become disconnected, as this causes the speed of the motor to increase indefinitely. It is usually necessary, also, to supply cut-out arrangements to provide against accidental overloads. In other words, it is necessary to provide means for switching off the power supply to the motor when the current either increases or decreases abnormally.

(b) Certain devices, such as thermionic valves, depend for their operation on the maintenance of a heating current (or the like) between relatively narrow limits. If the current increases unduly, filaments may be burned out, or if it decreases too much, the device will not operate satisfactorily, and some function carried out by the apparatus may fail. In either event it may be better to shut down the whole equipment, rather than to allow it to operate in a faulty manner.

(c) In automatic testing circuits, for example, circuits for inspecting resistances which have to meet certain tolerances, if the current through a resistance (or the voltage across it) is outside the limits corresponding to the tolerances, the arrangement of the invention can be adapted to reject the resistance concerned.

The object of the invention is to provide a simple arrangement for meeting the above described requirements, which involves the use of a temperature sensitive resistance element known as a thermistor.

According to the invention, there is provided an arrangement for connecting an electric supply to a load, and for disconnecting the load when the value of the voltage across it (or the value of the current supplied thereto) varies outside a predetermined range of values, comprising an indirectly heated thermistor the heating current of which is derived from the said voltage or current, and means controlled by the resistance element of the thermistor for disconnecting the load when the value of the said voltage or current varies outside the predetermined range.

Thermistors have been in use for some years and are composed of semi-conducting material characterised by a temperature coefficient of resistance which may be either positive or negative and which is moreover many times the corresponding coefficient for a pure metal such as copper. This property renders thermistors particularly suitable for a variety of special applications in electric circuits.

Various different materials are available for the resistance element of a thermistor, these various materials having different properties in other respects; as one example, a resistance material having a high negative temperature coefficient of resistance comprises a mixture of manganese oxide and nickel oxide, with or without the addition of certain other metallic oxides, the mixture being suitably heat treated.

Thermistors have been employed in two different forms: (a) known as a directly heated thermistor and comprising a resistance element of the thermally sensitive resistance material provided with suitable lead-out conductors or terminals, and (b) known as an indirectly heated thermistor comprising the element (a) provided in addition with a heating coil electrically insulated from the element. A directly heated thermistor is primarily intended to be controlled by the current which flows through it and which varies the temperature and also the resistance accordingly. Such a thermistor will also be affected by the temperature of its surroundings and may therefore be used for thermostatic control and like purposes with or without direct heating by the current flowing through it. An indirectly heated thermistor is chiefly designed to be heated by a controlling current which flows through the heating coil and which will usually, but not necessarily, be different from the current which flows through the resistance element, but this type of thermistor may also be subjected to either or both of the types of control applicable to a directly heated thermistor.

More detailed information on the properties of thermistors will be found in an article by G. L.

Pearson in the Bell Laboratories' Record, Dec. 1940, page 106.

The accompanying figure shows a schematic circuit diagram of an embodiment of the invention. A source S connected to terminals 1 and 2 supplies direct or alternating current to a load L connected to terminals 3 and 4. The source S may be a generator, or battery, or the like, or it may be any transmitting or translating device for electric waves or currents. The load L may be any receiving or utilisation device, for which it is necessary to break the circuit if the current supplied to it varies outside certain specified maximum and minimum limits.

Connected in series between terminals 1 and 3 are two pairs of contacts $a$ and $b$ operated respectively by relays A and B, and the heating coil $r$ of an indirectly heated thermistor T, shunted by an appropriate resistance $R_1$. The two relays A and B are connected in series with corresponding adjustable resistances $R_2$ and $R_3$ across the terminals 1 and 2, and the resistance element R of the thermistor T is connected to shunt the relay A and its series resistance $R_2$. When the relays A and B are not energized, the corresponding contacts $a$ and $b$ are open as shown. These contacts are bridged by the normally open contacts $k$, which may be closed by the operation of a key or relay by hand.

The thermistor will first be assumed to have a negative temperature coefficient of resistance. At first there is no current flowing into the load so no current flows through the heating coil and the thermistor is cold, so that its resistance is relatively high. Resistances $R_2$ and $R_3$ are adjusted so that relay A is operated by the current flowing through the shunt path, but relay B is not operated. Contacts $a$ are thus closed, but contacts $b$ remain open, and the thermistor is still cold. The circuit is now set by closing the contacts $k$ for a short time, thus allowing current to flow through the heating coil $r$ and shunt resistance $R_1$ to the load. The thermistor now heats up and the resistance R falls until the relay B operates, closing the contacts $b$. The contacts $k$ may now be released, and the circuit remains closed through the contacts $a$ and $b$. If the load current should now increase, the resistance R will fall still further until the relay A is released, opening the contacts $a$ and breaking the circuit. If instead, the load current decreases, the resistance R will increase until relay B is released, thus also breaking the circuit by opening the contacts $b$.

It will be evident, therefore, that the resistances $R_2$ and $R_3$ should be adjusted in accordance with the releasing currents of the relays A and B so that both relays remain operated when the load current is normal, and so that A releases when the current increases to a specified maximum value, and B releases when it decreases to a specified minimum value. The circuit can be reset at any time by closing the contacts $k$.

The resistance $R_1$ shunting the heating coil $r$ of the thermistor T will be chosen according to well known principles so that a suitable fraction of the load current is employed for heating the thermistor; and it may, of course, be omitted if the thermistor can be conveniently chosen to handle the whole of the load current.

It is to be noted that the thermistor could have a positive temperature coefficient of resistance without any change in the circuit arrangements. In this case, however, the functions of the relays A and B would simply be interchanged. Thus, when the thermistor is cold, before the contacts $k$ are closed to set the circuit, the resistance R will be low. The resistances $R_2$ and $R_3$ are then chosen so that relay B is operated, but A is not. On closing the contacts $k$ the thermistor heats up and R increases until A operates so that now contacts $a$ and $b$ are both closed. Then, the circuit conditions having been appropriately chosen, relay A releases when the load current becomes too small, decreasing R, and B releases when it becomes too large, increasing R.

It is to be noted that the relays A and B need not be supplied with current from the source S if this should be inconvenient. By removing the connections X and Y the relays may be operated from any other suitable source (not shown) which may be connected to the terminals 5 and 6.

By a simple modification of the circuit, the voltage applied to the load instead of the current supplied thereto may be made the controlling factor. In this case, the heating coil $r$ of the thermistor is connected across the terminals 1 and 2 instead of in series between the terminals 1 and 3, an appropriate resistance being connected in series with the heating coil if necessary, the circuit being in other respects unaltered. The heating of the thermistor now depends substantially on the voltage instead of on the current. The circuit will be adjusted in the manner explained so that it will be broken by one of the relays A or B when the applied voltage falls outside a specified range.

It will be evident that the relays A and B may be provided with additional contacts (not shown) for the purpose of operating alarms or performing any other desired functions, such, for example, as accepting or rejecting resistances or other test elements in automatic testing circuits.

What is claimed is:

1. Circuit control means, comprising a source of electrical energy, a load circuit, a thermistor having a heater and a resistance element and connected to have its heater responsive to the value of current in the load circuit, and a control circuit operative to open the load circuit when the current value therein varies outside of a predetermined range of material extent, the control circuit including two control relays each of said relays having a movable contact controlled by each relay respectively, said contacts connected in series in the load circuit.

2. Circuit control means, comprising a source of electrical energy, a load circuit, a thermistor having a heater and a resistance element and connected to have its heater responsive to the value of current in the load circuit, and a control circuit operative to open the load circuit when the current value therein varies outside of a predetermined range of a material extent, said control circuit including the said resistance element and two relays connected in series, the resistance element being connected across one of the relays.

3. Circuit control means, comprising a source of electrical energy, a load circuit, a thermistor having a heater and a resistance element and connected to have its heater responsive to the value of current in the load circuit, and a control circuit operative to open the load circuit when the current value therein varies outside of a predetermined range of material extent, said control circuit including the said resistance element and two relays, said relays connected in series in the control circuit, the resistance element being connected across one of the relays, and an adjustable resistance connected in series with each of the relays.

4. Circuit control means, comprising a source of electrical energy, a load circuit, a thermistor having a heater and a resistance element and connected to have its heater responsive to the value of current in the load circuit, and a control circuit operative to open the load circuit when the current value therein varies outside of a predetermined range of material extent, said control circuit including the said resistance element and two relays, each relay controlling a movable contact with the contacts in series in the load circuit, a shunt across the two relay contacts, and means for opening and closing the shunt.

5. Circuit control means, comprising a source of electrical energy, a load circuit, a thermistor having a heater and a resistance element and connected to have its heater responsive to the value of current in the load circuit, and a control circuit operative to open the load circuit when the current value therein varies outside of a predetermined range of material extent, said control circuit including the said resistance element, two relays, one in parallel with, and one in series with, the resistance element, each relay having a movable contact in series in the load circuit, an adjustable resistance in series with at least one of the relays, a shunt across the relay contacts, and means for opening and closing the shunt at will.

PRAFULLA KUMAR CHATTERJEA.

REFERENCES CITED

The following references are of record in the file of this patent:

UNITED STATES PATENTS

| Number | Name | Date |
| --- | --- | --- |
| 915,974 | Leonard | Mar. 23, 1909 |
| 1,159,892 | Brown | Nov. 9, 1915 |
| 2,140,930 | Welch | Dec. 20, 1938 |
| 1,516,646 | Roseby | Nov. 25, 1924 |
| 2,377,506 | McWhirter et al. | June 5, 1945 |
| 2,399,266 | Stiefel | Apr. 30, 1946 |